United States Patent [19]

Galuska et al.

[11] Patent Number: 4,940,124

[45] Date of Patent: Jul. 10, 1990

[54] SPRING CLIP FOR PREVENTING CLUTCH PLATE FLUTTER

[75] Inventors: Raymond D. Galuska, Mt. Prospect; Charles S. Murawski, Lindenhurst, both of Ill.

[73] Assignee: Komatsu Dresser Company, Libertyville, Ill.

[21] Appl. No.: 309,278

[22] Filed: Feb. 9, 1989

[51] Int. Cl.$^5$ .................. F16D 13/52; F16D 13/69
[52] U.S. Cl. .................. 192/70.28; 192/30 V
[58] Field of Search .......... 192/70.28, 70.2, 30 V; 188/73.37, 73.38

[56] References Cited

U.S. PATENT DOCUMENTS

| | | | |
|---|---|---|---|
| 2,600,520 | 6/1952 | Spase | 192/70.28 X |
| 3,249,189 | 5/1966 | Schjolin et al. | 192/70.28 X |
| 3,455,423 | 7/1969 | Lindquist | 192/107 R |
| 3,735,474 | 5/1973 | Bark et al. | 29/451 |
| 4,469,205 | 9/1984 | Stoka et al. | 188/73.38 X |
| 4,479,569 | 10/1984 | Kummer et al. | 188/73.38 X |
| 4,673,065 | 6/1987 | Gerard et al. | 188/73.38 |

FOREIGN PATENT DOCUMENTS

| | | | |
|---|---|---|---|
| 645029 | 5/1937 | Fed. Rep. of Germany | 192/70.2 |
| 2114812 | 10/1971 | Fed. Rep. of Germany | 188/73.38 |
| 446143 | 3/1949 | Italy | 192/70.28 |
| 614913 | 12/1948 | United Kingdom | 192/70.28 |
| 2103312 | 2/1983 | United Kingdom | 192/70.28 |

Primary Examiner—Rodney H. Bonck

[57] ABSTRACT

A spring clip is constructed in a folded manner so as to be slipped over a peripheral edge of a clutch plate and attached thereto. The sides of the folded spring clip include fastening sections for receiving therein the clutch plate edge and having inwardly bent tabs which interlock with a hole in the clutch plate for providing a secure attachment thereto. Each spring clip has outwardly directed engaging sections for biasing neighboring clutch plates to reduce flutter.

21 Claims, 2 Drawing Sheets

SPRING CLIP FOR PREVENTING CLUTCH PLATE FLUTTER

BACKGROUND OF THE INVENTION

Clutches are employed in many types of vehicles to provide an interruptable transfer of power from a driving force, such as an engine, to a driven mechanism, such as wheels or tracks. Mechanical clutches having clutch plates and friction pads are available in a variety of designs for providing such an interruptable connection between a power source and a driven mechanism. When engaged, the clutch plates and friction pads are forced together so that the clutch elements rotate in unison, thereby causing the power source to drive the driven mechanism. When released, the friction pads, which may be connected to the driven member, are removed from engagement with the clutch plates which generally remain rotating at the speed of the power source.

In many clutch systems a phenomenon termed "flutter" is frequently encountered in which the clutch plates themselves tend to vibrate or move axially about a common clutch shaft. The flutter experienced in such clutch systems is often excessive enough that the clutch plates themselves disintegrate during rotation and damage the entire clutch assembly. In other less excessive cases, clutch plate flutter causes momentary engagement with the friction pads, whereupon such pads become worn and sufficient heat can be generated within the clutch system to present reliability problems.

The problem of clutch plate flutter has been recognized and corresponding solutions have been attempted. For example, disclosed in U.S. Pat. 3,735,474 is the use of an elastomeric element for maintaining a separation between clutch disks. However, such an elastomeric element tends to degrade over time, often due to both the high temperatures experienced within a clutch assembly, and the hydraulic fluid utilized to cool the clutch parts. In addition, special precautions and procedures are required to install the elastomeric spacers within the clutch plates, thus requiring additional labor which adds cost to the clutch assembly.

From the foregoing, it can be seen that a need exists for an improved technique and apparatus which reduces clutch flutter, which operates efficiently and which is easily installed on existing clutch plates.

SUMMARY OF THE INVENTION

In accordance with the present invention, the disclosed clutch plate flutter preventer substantially reduces or eliminates the disadvantages and shortcomings associated with the prior art techniques. According to the invention, a spring clip is constructed which prevents flutter of rotating clutch plates which experience the same, and which is easily installed thereon by simply pressing the clip onto an apertured tang conventionally fabricated on the peripheral edge of the clutch plates.

According to the preferred embodiment of the invention, the spring clip is constructed by first stamping the spring clip from a sheet of spring-like or resilient material. The stamped spring clip is symmetrical, including opposing pairs of engaging sections and an opposing pair of fastening sections. The engaging sections on each side are separated from the intermediate fastening section by respective slots or cut-outs in the sheet material. Next, the sheet material is bent or folded such that the opposing engaging sections generally form a v-shape, while the intermediate fastening sections are essentially parallel for receiving therein the clutch plate. The edge surfaces of the "V" shaped clip provide a bias to neighboring clutch plates and thereby prevent flutter. Stamped within each intermediate fastening section is an inwardly extending tab which engages an aperture or hole in the clutch plate tang, thereby fixing the spring clip and preventing its separation from the clutch plate when encountering high speed rotation.

In another embodiment of the invention, the intermediate fastening sections themselves define the tabs, each of which are bent at a non-symmetrical shape to achieve a high quality lock of the clip within the hole of the clutch plate tang. In yet another embodiment of the invention, the spring clip sheet material is initially bent to form essentially parallel sides for receiving therein the clutch plate, and wherein the material on each side is again bent to form an overall "w" shaped clip having engaging surfaces extending away from the parallel sides. Tabs are punched within the parallel sides and bent inwardly for providing a secure lock to the hole of the clutch plate tang.

BRIEF DESCRIPTION OF THE DRAWINGS

Further features and advantages will become apparent from the following and more particular description of the preferred and other embodiments of the invention, as illustrated in the accompanying drawings in which like reference characters generally refer to same parts throughout the views, and in which.

DETAILED DESCRIPTION OF THE INVENTION

Figure 1:
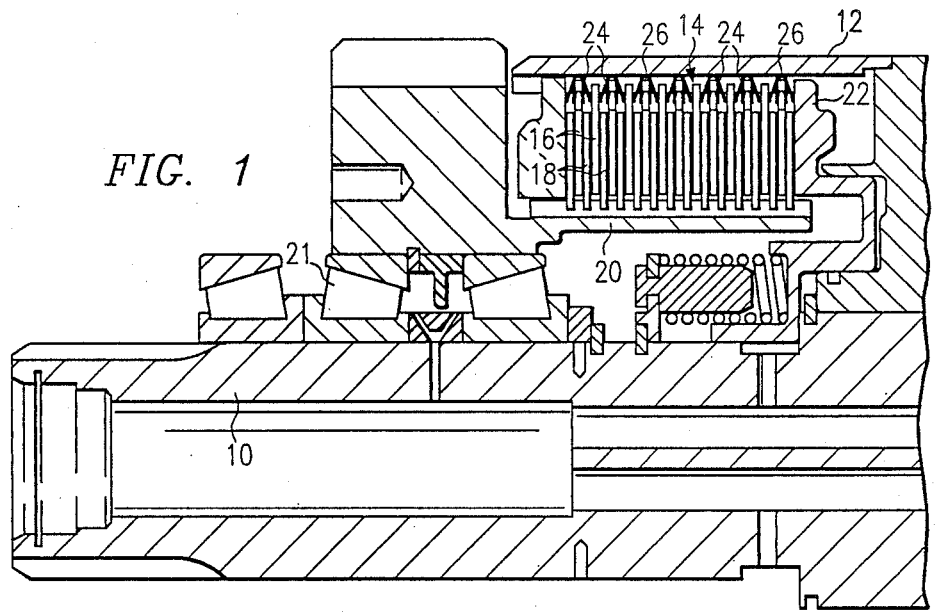
FIG. 1 illustrates a clutch assembly in which the invention may be advantageously practiced.

Referring now to FIG. 1 of the drawings, there is illustrated a portion of a clutch system utilizing the spring clips of the invention to reduce clutch plate flutter. Particularly illustrated is a portion of a clutch assembly well adapted for use in drive transmissions or track steering mechanisms such as the type commonly employed with tractor-crawler vehicles. It is to be understood that the other half of the clutch assembly is not shown, and moreover, another entire such clutch assembly can be employed, one operable during forward movements of the vehicle and the other operable during reverse movements of the vehicle.

The exemplary clutch assembly includes a drive shaft 10 connected to a power source. A clutch housing 12 is rotatable with respect to the shaft 10, and is connected to the driven mechanism. A number of clutch plates and friction pads, generally designated as reference number 14, are frictionally engagable to connect the housing 12 to the shaft 10 and thereby provide a direct connection between the power source and the driven mechanism. When the clutch plates are released from the corresponding friction pads, the clutch shaft 10 can rotate independently of the clutch housing 12.

More specifically, a plurality of clutch plates 16 are interleaved between a corresponding number of friction pads 18. The clutch plates 16 are rotatably fixed but axially movable within the internally splined housing 12, while the clutch pads 18 are rotatably fixed but axially movable in externally splined portions of a frame structure 20 which is rotatable with respect to the clutch housing 12. The frame structure 20 is rotatable about the shaft 10 via bearings 21, while the housing 12 is fixed to the shaft 10. A number of illustrated hydraulic elements comprising valves, springs, passageways, etc. enable hydraulic control of the clutch in a conventional manner to achieve engagement or disengagement of the assembly. A piston 22 is effective to force the combination of clutch plates 16 and friction pads 18 axially along their respective splined structures and cause a frictional engagement therebetween to provide a direct connection between the clutch shaft 10 and the clutch housing 12. In the drawing, the piston 22 is forced to the left to accomplish such engagement, and is forced to the right to release the frictional engagement of the clutch.

During release of the clutch plates 16 and friction pads 18, the clutch pads 18 rotate with the housing 12 and have a certain degree of axial freedom to move on the internal splines of the housing 12. This axial degree of freedom gives rise to the flutter noted above. In accordance with the invention, the flutter is substantially eliminated by the provision of a number of spring clips 24 which are fixed to tangs 26 of certain ones of the clutch plates 16 to reduce the axial degree of freedom during release of the clutch. As noted in FIG. 1, the spring clips 24 need only be fixed to the peripherally located tangs 26 of every other clutch plate 16. In this manner, an axial tension is maintained on each clutch plate 16 to eliminate or reduce such axial movement during release and thereby eliminate flutter.

Figure 2:
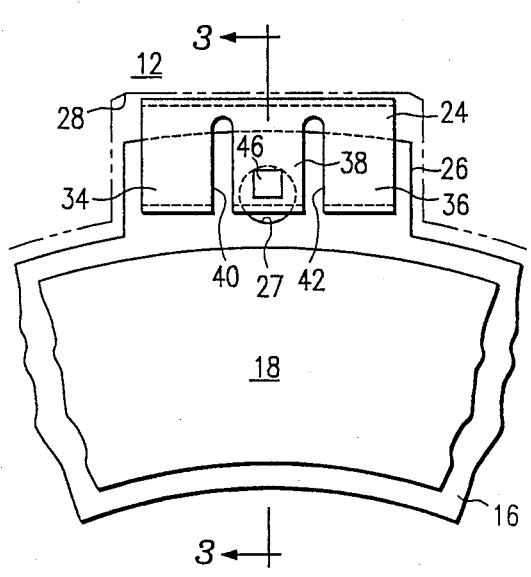
FIG. 2 is a side view of a portion of a clutch plate assembly, illustrating the spring clip of the invention attached thereto.
Figure 3:
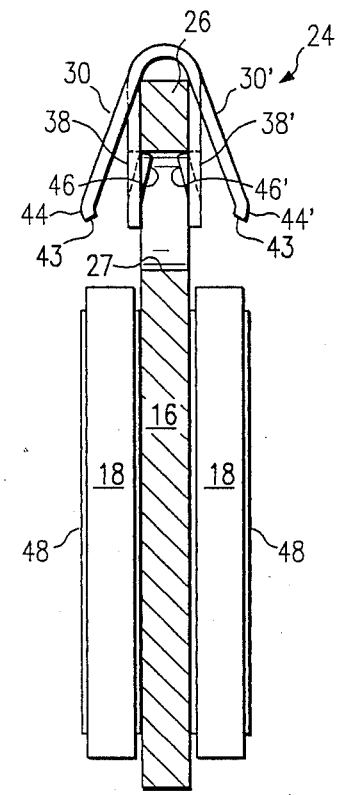
FIG. 3 is a cross-sectional view taken along line 3—3 of FIG. 2.

With reference to FIGS. 2 and 3, there are illustrated the details of the construction of the spring clip 24 according to the preferred form of the invention. The spring clip 24 is shown installed on the tang 26 of the clutch plate 16. Of course, a single clutch plate 16 would have plural tangs spaced around the periphery thereof, each having a spring clip 24 fastened thereto. However, on certain types of clutch plates which have many tangs 26, spring clips 24 need only be installed on a sufficient number of tangs 26 to maintain both balance and the neighboring clutch plates spaced therefrom. As noted in the drawing, the tang 26 fits within a spline 28 formed within the clutch housing 12. Hence, when the clutch is engaged but yet rotating, the clutch plate tangs 26 carry with them the clutch housing 12 due to the engagement between the tangs 26 and the internal splines 28. As noted above, the splines 28 do allow the clutch plates 16 a certain degree of axial freedom of movement for frictionally engaging the clutch pads 18.

The spring clip 24 of the invention is constructed generally in an angular form having a first side 30 and a second side 30'. The clip 24 is symmetrical, with similar parts being denoted with the same numerals, one numeral of the pair having a prime notation. Each side of the clip generally includes three sections defined by two engaging sections 34 and 36 and an intermediate fastening section 38. The engaging sections 34 and 36 are separated from the fastening section 38 by a pair of slots 40 and 42. The slots allow the opposing engaging sections to remain at an angled orientation while the opposing fastening sections 38 are formed to a parallel relationship, thereby allowing the clutch disk 16 to be inserted therein. This shown in FIG. 3 of the drawings.

The lower edge 43 of each side is bent inwardly somewhat to form a rounded engaging surface 44. In order to securely and reliably fix the spring clip 24 to the clutch plate tang 26, the opposing fastening sections 38 have formed therein tabs 46 which are bent inwardly to interlockingly engage the hole 27 formed in the clutch plate tang 26. The tab 46 is formed by a three-sided punchthrough of the resilient spring material, and then the bending inwardly of the resulting tab 46. This construction facilitates the installation and the fastening of the spring clip 24 on the clutch plate 16. The installation is easily accomplished by simply pushing the spring clip 24 onto the tang 26 until both of the tabs 46 snap into the opening of the hole 27. The spring clip 24 then becomes securely fixed to the clutch plate 26 so that separation thereof, due to centrifugal force of the spinning clutch plate, is avoided. The spring clips 24 can be removed by prying the opposing fastening sections 38 apart to disengage the tabs 46 from the hole 27.

The angular degree by which the spring clip 24 is formed depends upon the spacing desired between neighboring clutch plates before the spring clips 24 begin to compress. Preferably, the spring clips 24 are formed at an angle such that the engaging surfaces 44 extend outwardly only a small distance beyond the friction surfaces 48 of the pads 18 to engage neighboring clutch plates. In this manner, clutch plate flutter is reduced and substantial additional pressure is not required to compress the clutch assembly during clutch engagement. As can be appreciated, during release of the clutch assembly, the neighboring clutch plates 16 can engage the spring clip engaging surfaces 44, whereupon the axial movement thereof is reduced or eliminated, as is the attendant flutter. Also, the neighboring clutch plates 16 do not rub against the fastening sections 38 and thus clip wear is reduced and the accompanying friction and heat is eliminated.

Figure 5:
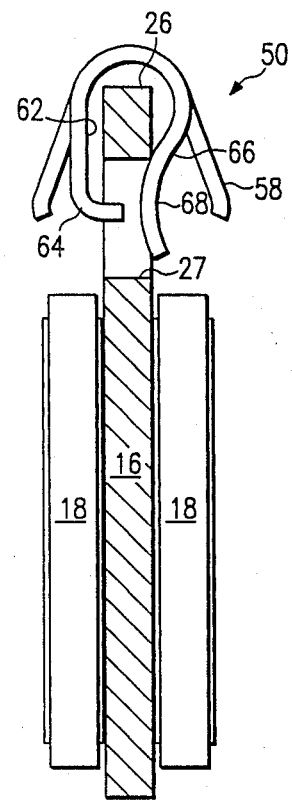
FIG. 5 is a cross-sectional view of the disk plate assembly along line 5—5 of FIG. 4.
Figure 4:
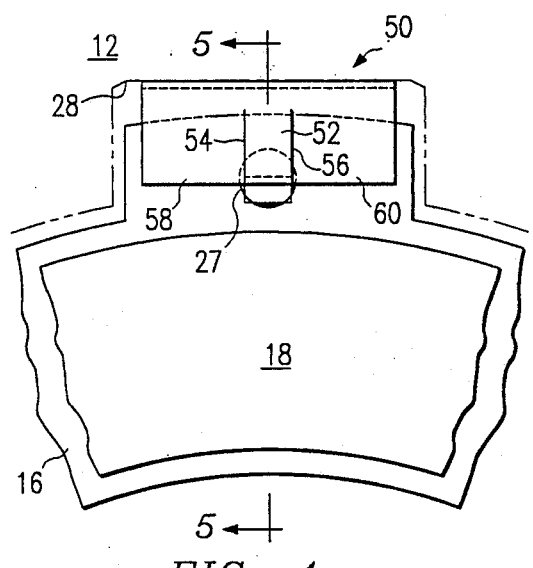
FIG. 4 illustrates another embodiment of the invention having irregular-shaped locking tabs.

With reference to FIGS. 4 and 5, there is illustrated another embodiment of the invention. Here, the spring clip 50 is formed in a manner substantially similar to that described above in connection with FIG. 3, except for the construction of the fastening sections and associated tabs. As illustrated in FIG. 4, a fastening section 52 is formed by stamping a pair of slits 54 and 56 in the opposing sides of the clip 50. The engaging sections 58 and 60 are then folded or bent to define the desired angle, while the fastening section 52 is formed to the desired shape. As can be seen, the opposing fastening sections 52 are somewhat longer than the engaging sections 58 and 60 for the purpose describe below. However, the fastening section angle in the spring clip 50 need not be as acute as that show in FIG. 3, as the fastening sections do not need to be as snug fitting to the clutch plate as those shown in the embodiment of FIG. 3.

As shown in FIG. 5, one fastening section is formed as orthogonal section having a vertical side 62 substantially parallel to the clutch plate 16, and a terminal end 64 which is bent inwardly for insertion into the hole 27 of the clutch plate tang 26. The other fastening section 66 is bent inwardly with a curvature, having a concave portion 68 which enters the hole 27 of the clutch plate tang 26. With this construction, the spring clip 50 remains securely engaged within the hole 27 of the clutch plate tang 26, irrespective of the differences in pressure which may be applied to the opposing sides of the clip 50 as a result of different flutter tendencies of the neighboring clutch plates 16.

The spring clip embodiment of FIG. 5 is installed on a clutch plate 16 by pressing the curved fastening section 66 against the side of the clutch plate tang until such section is spread apart from the orthogonal fastening section 62, whereupon the clip 50 can be pushed down onto the clutch plate 16 until the orthogonal end 64 enters the tang hole 27. The spring clip 50 is then captured and held fixed to the clutch plate 16.

Figure 6:
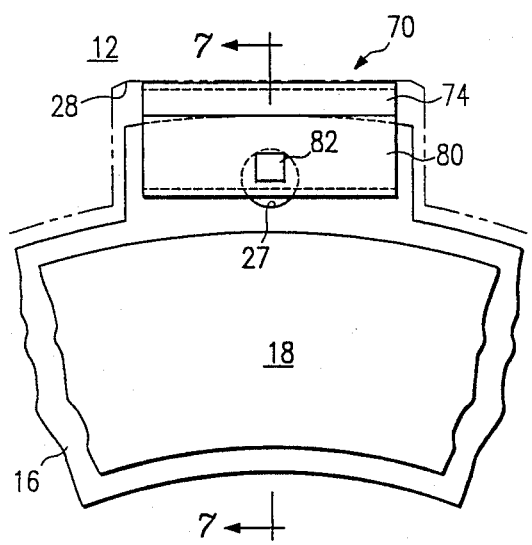
FIG. 6 is a side view of a portion of the clutch plate assembly, illustrating yet another embodiment of the spring clip of the invention.
Figure 7:
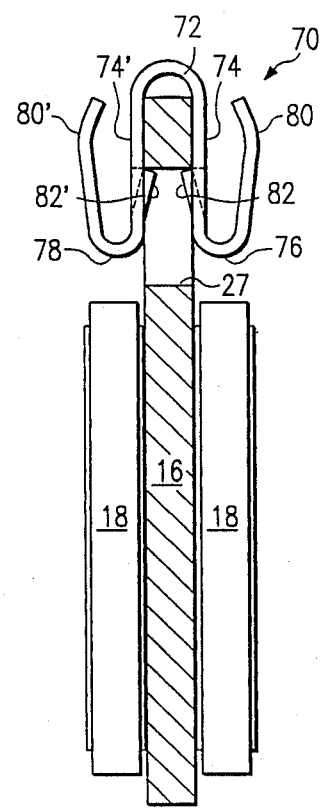
FIG. 7 is a cross-sectional view of the disk plate assembly, taken along line 7—7 of FIG. 6.

Yet another embodiment of a spring clip 70 of the invention is shown in FIGS. 6 and 7. In this embodiment, the resilient sheet of material from which the spring clip 70 is formed is initially folded at location 72 to form essentially parallel sides 74 and 74' for receiving therein the clutch plate 16. The resilient material is then again bent at two locations 76 and 78 to generally form a w-shaped clip. Additional slight bending near the side edges of the clip 70 can be accomplished to define smooth engaging surfaces 80 and 80'. Tabs 82 and 82' are again formed by a three-sided punchthrough of the material and then conducting an inward bending thereof. The tabs 82 are formed essentially in the same manner as those described in connection with the embodiment of FIG. 3. Also, installation of the spring clip 70 shown in FIGS. 6 and 7 is accomplished in the same manner as that described above with the embodiment of FIGS. 2 and 3. As can be realized, the engaging surface area of the spring clip 70 is greater than that of the clips described above.

Each of the springs clips of the invention can be fabricated in manners described above, using a resilient material having spring-like properties. A spring steel of SAE 1070–1080 class is suitable for use in fabricating the invention. The thickness of such a material may be on the order of 0.025 and may vary depending on the desired stiffness of the clip and the resilient properties of the material. The bending and punching from a spring stock material can be accomplished with conventional stamping and bending machines.

The foregoing discloses an improved device for reducing flutter in plate-type clutches. The spring clip of the invention is constructed of a resilient material for slipping onto the peripheral edge of a clutch plate, and preferably the tang thereof. Engaging sections of the clip extend outwardly to maintain a separation of neighboring clutch plates and reduce flutter. The spring clip is constructed with inwardly angled tab structures for fixing to a hole in the clutch plate tang and thereby securely fasten the spring clip to the clutch plate. Installation of the spring clip of the invention to a clutch plate is simplified without special equipment, and is effected simply by pushing the spring clip onto the peripheral edge of the clutch plate until the tabs snap into the tang opening.

The present invention has been described with respect to preferred and alternate embodiments thereof. However, it should be understood that various changes and modifications can be made by those skilled in the art which yet fall within the spirit and scope of the invention, as defined by the appended claims.

What is claimed is:

1. A spring clip adapted for attachment to a clutch plate of the type having an indention formed therein, said clip being effective to reduce flutter in a multiple clutch plate assembly, comprising:
a thin sheet of material having spring-like characteristics and folded to define opposing engaging sections so that when applied to a peripheral edge of the clutch plate by pushing said clip onto a external peripheral edge of the plate toward a center thereof, opposing engaging surface of each said engaging section extend outwardly from respective friction side surfaces of associated friction pads, and a fastening tab attached to said clip, having a free end extending inwardly and angled so that said clip can be pushed onto the eternal peripheral edge of said clutch plate and locked during installment thereof, but said angled tab engages the indention of said clutch plate and prevents removal of the clip during clutch operation.

2. The spring clip of claim 1, further including opposing fastening sections and one said tab attached to each said fastening section for engaging the clutch plate and securely fastening the clip thereto.

3. The spring clip of claim 1, wherein each said engaging section includes a side edge and a bend in each said section near said side edge to define said opposing engaging surfaces.

4. The spring clip of claim 3, wherein the bend of each said section is angled inwardly.

5. The spring clip of claim 3, wherein said spring clip is cross-sectionally w-shaped, with said fastening tabs extending inwardly.

6. A spring clip adapted for attachment to a clutch plate of the type having indentions in opposing sides thereof, to reduce flutter in a multiple plate clutch assembly, comprising:
a clip formed of a resilient material and folded so as to be mounted to a clutch plate at a peripheral edge thereof, said fold being such that an acute angle is formed so that ends of the spring clip extend outwardly from respective side surfaces of the clutch plate for engagement with other similar clutch plates, said clip further including a pair of tabs formed inwardly toward each other for snap locking with the indentions of the clutch plate so that the spring clip can be easily installed by slipping onto the peripheral edge until snap locked thereto and securely fastened to prevent removal during clutch operation.

7. The spring clip of claim 6, wherein said clip has opposing curved surfaces, said curved surfaces being adapted for engaging other similar clutch plates.

8. The spring clip of claim 6, wherein said spring clip is constructed of a spring steel material.

9. The spring clip of claim 6, wherein said clip includes a pair of opposing sides, each side including an engaging section and a fastening section separated therefrom by a slot so that said engaging sections extend outwardly and said fastening sections are adapted to receive therein the clutch plate for fastening thereto.

10. The spring clip of claim 9, wherein each side of said clip is constructed having a pair of engaging sections separated from the fastening section by a pair of said slots.

11. The spring clip of claim 9, wherein said spring clip is adapted for use with a clutch plate having a hole defining said indentions, and said spring clip includes an inwardly directed tab on each side fastening section, and ends of said tabs engaging an inner edge of each said clutch plate hole.

12. A spring clip adapted for attachment to a clutch plate to reduce flutter thereof, comprising:
a thin sheet of material having a spring characteristic and folded to define at least a pair of opposing engaging sections so that when fixed about a peripheral edge of the clutch plate an opposing engaging surface of each said section extends outwardly from respective friction side surfaces of the clutch plate;
each said engaging section of a side of said clip being separated from a respective fastening section by a corresponding slot in said engaging section, each said fastening section being generally parallel so as to engage corresponding parallel side surfaces of said clutch plate; and
each said fastening section including an inwardly directed tab for engaging the clutch plate for fixing the spring clip thereto.

13. The spring clip of claim 12, wherein said clip is constructed as a symmetrical article, and wherein said tabs are angled inwardly with respect to said fastening sections.

14. The spring clip of claim 12, wherein said clip is w-shaped.

15. A clutch assembly, comprising
a plurality of clutch plates connectable to one of driving power source or a driven mechanism;
a plurality of friction pads engagable with said clutch plates and connectable to the other of the driving power source or the driven mechanism;
said clutch plates having associated tangs arranged around a peripheral edge of each said clutch plate, each said tang having an indention on a side surface thereof; and
a spring clip attachable to desired ones of said clutch plate tangs and having engaging surfaces extending outwardly from the side surfaces of the clutch plates for engaging neighboring clutch plates to apply a bias thereto for reducing clutch plate flutter, each said spring clip being engaged to a respective tang by a tab formed in said clip which allows said clip to be pushed onto the tang and snap locked with said indention so that removal thereof is prevented during operation of the clutch.

16. The clutch assembly of claim 15, wherein said clutch plate tangs include a hole therein defining said indention, and said tab locks in said hole to secure the clip to the clutch plate.

17. The clutch assembly of claim 15, wherein each said clip includes a parallel fastening section with said tab for securement to the clutch plate, and an engaging section extending in an angled manner outwardly for engaging the neighboring clutch plates.

18. The clutch assembly of claim 17, wherein said engaging section is separated from said fastening section by a slot.

19. A spring clip adapted for attachment to a clutch plate to reduce flutter thereof, comprising:
a thin sheet of material having a spring characteristic and folded to define at least a pair of opposing engaging sections so that when fixed about a peripheral edge of the clutch plate an opposing engaging surface of each said section extends outwardly from respective friction side surfaces of the clutch plate;
each said engaging section of a side of said clip being separated from a fastening section by a corresponding slot in said engaging section; and
each said fastening section including an inwardly directed tab for engaging the clutch plate for fixing the spring clip thereto, one said tab being orthogonal and having a terminal end insertable within a hole in the clutch plate, and another tab being curved for fitting within said clutch plate hole.

20. a clutch assembly, comprising:
a plurality of clutch plates connectable to one of a driving power source or a driven mechanism;
a plurality of friction pads engagable with said clutch plates and connectable to the other of the driving power source or the driven mechanism;
said clutch plates having associated tangs arranged around a peripheral edge of said clutch plate, and each said tang having a hole therein; and
a spring clip attachable to desired ones of said clutch plate tangs and having engaging surfaces extending outwardly from the side surfaces of the clutch plates for engaging neighboring clutch plates to apply a bias thereto for reducing clutch plate flutter, said spring clip including a tab for engaging a respective clutch plate tang hole to secure the clip thereto.

21. A spring clip adapted for attachment to a clutch plate to reduce flutter in a multiple clutch plate assembly, comprising:
a thin sheet of material having spring-like characteristics and folded in a cross-sectional W-shape to define opposing engaging sections so that when fixed to a peripheral edge of the clutch plate, opposing engaging surfaces of each said engaging section extend outwardly from respective friction side surfaces of associated friction pads, each said engaging section includes a side edge and a bend in each said section near said side edge to define said opposing engaging surfaces, and a fastening tab attached to said clip, extending inwardly and angled so that said clip can be pushed onto the peripheral edge of said clutch plate and locked during installment thereof, but said angled tab engages said clutch plate and prevents removal of the clip during clutch operation.

* * * * *

UNITED STATES PATENT AND TRADEMARK OFFICE
CERTIFICATE OF CORRECTION

PATENT NO. : 4,940,124

DATED : July 10, 1990

INVENTOR(S) : Raymond D. Galuska, et al.

It is certified that error appears in the above-identified patent and that said Letters Patent is hereby corrected as shown below:

Column 1, after title "SPRING CLIP FOR PREVENTING CLUTCH PLATE FLUTTER" insert subtitle --TECHNICAL FIELD OF THE INVENTION-- and --The present invention relates in general to clutch mechanisms, and more particularly to methods and apparatus for preventing flutter or vibration of rotating clutch plates--.

Column 7, line 27, after "comprising" insert --:--.

Signed and Sealed this

Third Day of September, 1991

Attest:

HARRY F. MANBECK, JR.

Attesting Officer

Commissioner of Patents and Trademarks